(No Model.)

H. W. DAVIS & W. J. SEIPLE.
WEEDING IMPLEMENT.

No. 535,163. Patented Mar. 5, 1895.

Witnesses
Chas. A. Ford
C. E. Boyle

Inventors
Henderson W. Davis,
and Wiloughby J. Seiple,
By their Attorneys,
C. A. Snow & Co.

UNITED STATES PATENT OFFICE.

HENDERSON W. DAVIS AND WILOUGHBY J. SEIPLE, OF FOSTORIA, OHIO.

WEEDING IMPLEMENT.

SPECIFICATION forming part of Letters Patent No. 535,163, dated March 5, 1895.

Application filed December 24, 1894. Serial No. 532,839. (No model.)

*To all whom it may concern:*

Be it known that we, HENDERSON W. DAVIS and WILOUGHBY J. SEIPLE, citizens of the United States, residing at Fostoria, in the county of Seneca and State of Ohio, have invented a new and useful Weeding Implement, of which the following is a specification.

Our invention relates to a weeding and root extracting implement adapted to facilitate the removal of weeds and roots without breaking and leaving portions thereof in the ground, such extraction being accomplished with facility and rapidity.

Further objects and advantages of this invention will appear in the following description, and the novel features thereof will be particularly pointed out in the claim.

Figure 1:
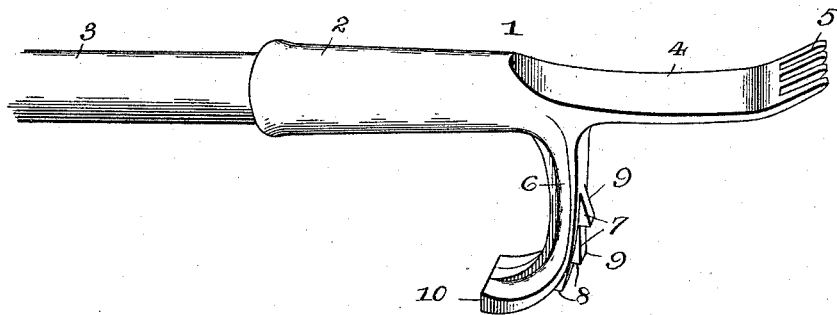
Figure 2:
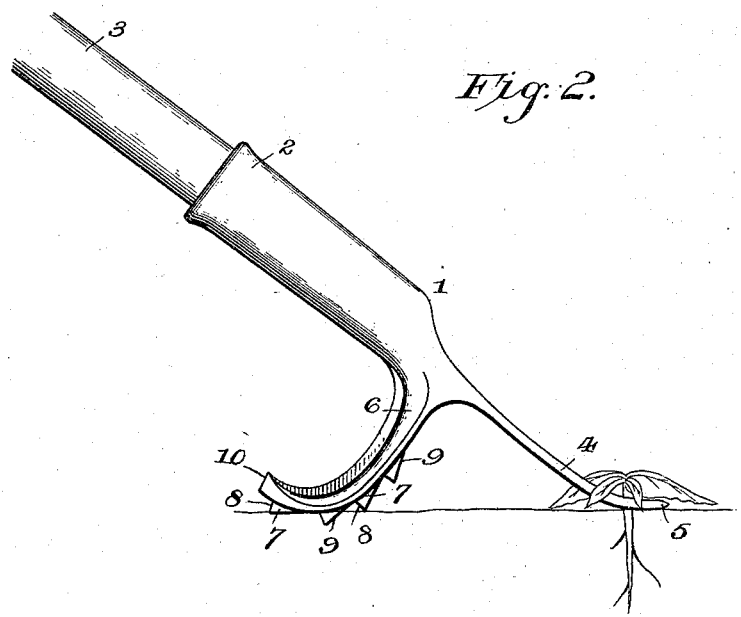

In the drawings:—Figure 1 is a perspective view of an implement embodying our invention. Fig. 2 is a side view showing the tool in operative position.

Similar numerals of reference indicate corresponding parts in both the figures of the drawings.

1 designates the head of the improved weeding and root extracting device having a socket 2, for the reception of the extremity of a handle 3, and integral with said socket is a flat blade 4, not exceeding the socket in width and terminating at its lower end in blunt fingers 5 having parallel facing sides. The blade 4 is curved slightly to form a concave front surface and a convex rear surface, the concave and convex surfaces being parallel, and the lower fingered or toothed extremity of the blade is turned or bent forward to lie in a plane at an angle to the axis or longitudinal center of the socket.

Integral with the head at an intermediate point, and preferably adjacent to the upper end of the blade portion, is a perpendicularly disposed fulcrum arm 6, convexed downwardly and provided upon its convex surface with a series of lugs or projections 7 having abrupt outer or rear sides 8 and beveled front sides 9, the function of said lugs or projections being to prevent backward sliding of the implement during the use thereof as a lever in extracting a weed or root, the operative position being shown clearly in Fig. 2. The rear end of the fulcrum arm is upturned and terminates in a horizontal step 10 adapted to receive the downward pressure of the foot of the operator in order to force the blade into the ground preparatory to inclining the implement and using it as a lever to lift the weed or root.

It will be seen that the construction of the blade facilitates insertion in the ground, in that the fingers or teeth are pointed at their lower ends and are inclined forward to run under a root or weed; and it will be seen, also, that the liability of cutting or tearing a weed or root and thus leaving a portion thereof in the ground is reduced to a minimum by constructing the fingers or teeth with abrupt or blunt edges and with their proximate sides parallel.

After the engagement of the blade of the implement with a root or weed the handle is inclined rearwardly, as indicated in Fig. 2, to bring the convexed surface of the fulcrum arm in contact with the surface of the ground, when upward pressure is exerted upon the root or weed. In forcing the blade into the ground the step 10 which forms the terminal of the fulcrum arm provides for the application of a positive pressure in a direction parallel with the longitudinal center of the blade, and it will be understood that the construction is simplified by utilizing the fulcrum arm as the support for the step.

Various changes in the form, proportion, and the minor details of construction may be resorted to without departing from the spirit or sacrificing any of the advantages of this invention.

Having described our invention, we claim—

A weeding or root extracting tool having a head provided with a handle-socket and an integral flat blade having a concave front and a convex rear surface and terminating at its lower end in forwardly deflected or inclined blunt fingers or teeth having parallel proximate sides, and a fulcrum arm arranged at an intermediate point of the head, curved upwardly toward its rear end, provided upon its under convex surface with a series of studs or projections having abrupt rear and beveled front sides, and terminating in a step having a bearing surface at right angles to the longitudinal center of the head, substantially as specified.

In testimony that we claim the foregoing as our own we have hereto affixed our signatures in the presence of two witnesses.

HENDERSON W. DAVIS.
WILOUGHBY J. SEIPLE.

Witnesses:
MORGAN CRAMER,
BENJAMIN EVENBECK.